(12) United States Patent
Livesay

(10) Patent No.: US 7,693,283 B2
(45) Date of Patent: Apr. 6, 2010

(54) METHODS AND APPARATUS FOR PROVIDING USER ANONYMITY IN ONLINE TRANSACTIONS

(76) Inventor: Paul Owen Livesay, 512 Prospect St., San Carlos, CA (US) 94070

( * ) Notice: Subject to any disclaimer, the term of this patent is extended or adjusted under 35 U.S.C. 154(b) by 902 days.

(21) Appl. No.: 11/503,709

(22) Filed: Aug. 14, 2006

(65) Prior Publication Data
US 2006/0274896 A1 Dec. 7, 2006

Related U.S. Application Data

(63) Continuation of application No. 09/510,919, filed on Feb. 22, 2000, now Pat. No. 7,203,315.

(51) Int. Cl.
*G06F 15/16* (2006.01)
*G06F 17/00* (2006.01)
*G06F 17/30* (2006.01)
*H04K 1/00* (2006.01)

(52) U.S. Cl. .............................. 380/255; 726/4; 726/5; 707/5; 707/9; 709/201

(58) Field of Classification Search ................. 709/201; 726/4, 5; 380/255
See application file for complete search history.

(56) References Cited

U.S. PATENT DOCUMENTS

| | | |
|---|---|---|
| 5,557,518 A | 9/1996 | Rosen |
| 5,671,280 A | 9/1997 | Rosen |
| 5,729,537 A | 3/1998 | Billström |
| 5,812,668 A | 9/1998 | Weber |
| 5,884,272 A | 3/1999 | Walker et al. |
| 5,907,677 A | 5/1999 | Glenn et al. |
| 5,913,203 A | 6/1999 | Wong et al. |
| 5,956,699 A | 9/1999 | Wong et al. |
| 5,961,593 A | 10/1999 | Gabber et al. |
| 5,978,840 A | 11/1999 | Nguyen et al. |
| 5,983,208 A | 11/1999 | Haller et al. |
| 5,987,132 A | 11/1999 | Rowney |
| 6,006,200 A | 12/1999 | Boies et al. |
| 6,026,379 A | 2/2000 | Haller et al. |

OTHER PUBLICATIONS

A local name server for organizational message handling systems; Spahni, S.; Harms, J.; Digital Communications, 1988. Mapping New Applications onto New Technologies, 1988 International Zurich Seminar on Mar. 8-10, 1988 pp. 239-246.*

(Continued)

*Primary Examiner*—David Y Jung

(57) ABSTRACT

End-to-end user anonymity is provided in electronic commerce or other types of online transactions through the use of an intermediary. An intermediary machine, which may be implemented in the form of a set of servers, receives communications from a consumer or other user, and generates and maintains an alias for that user. Connections between the user machine and any online vendor or other web site are implemented through the intermediary using the alias. The intermediary then communicates with the online vendor and supplies intermediary payment information. The online vendor charges the purchase to the intermediary, and redirects the delivery of the goods or services to the destination address provided by the intermediary. The intermediary charges the payment card number of the user, and arranges for the redirection of the delivery to the real user address.

7 Claims, 9 Drawing Sheets

OTHER PUBLICATIONS

Protocols for Authenticated Anonymous Communications; Fathi, H.; SeongHan Shin; Kobara, K.; Imai, H.; Personal, Indoor and Mobile Radio Communications, 2007. PIMRC 2007. IEEE 18th International Symposium on Sep. 3-7, 2007 pp. 1-5.*

A shared secure server for multiple closed networks; Terao, K.; Ono, S.; Internet Workshop, 1999. IWS 99 Feb. 18-20, 1999 pp. 32-39.*

Visa-Electronic Commerce-Set, Internet Shopping, http://www.visa.com/nt/ecomm/security/set.html, 4 pages, Jan. 19, 2000.

"Privacy: Outrage on the Web," Business Week, pp. 38-40, Feb. 14, 2000.

Q. Hardy, "Window Shopping," Forbes, pp. 62-64, Jan. 24, 2000.

Enonymous™ Advisor, http://www.enonymous.com, 5 pages, Feb. 1, 2000.

Introducing Freedom™, http://www.freedom.net/info/, 5 pages, Feb. 1, 2000.

Visa-Merchant Operations Education, http://www.visa.com/fb/moe/main.html, 3 pages, Jan. 19, 2000.

CBS.MarketWatch.com—Trintech, Entrust Technologies Team Up on Net Security Payments, http://www.cbsmarketwatch.com/news/current/ttpa.htx?source=htx/http2_mw, 2 pages, Feb. 16, 2000.

M. Marriott, "It's Not Big Brother, It's Customer Service," http://www.nytimes.com/ library/tech/00/01/circuits/articles/27serv.html, 6 pages, Jan. 27, 2000.

First Data Merchant Services, Internet Credit Card Processing 101, http://www.firstdata.com/internetccproc101.html, 4 pages, Mar. 1, 2000.

"OnLine Privacy: It's Time for Rules in Wonderland," Business Week, pp. 83-96, Mar. 20, 2000.

L. Goldman, "Credit Slips," Forbes, pp. 56-58, May 1, 2000.

L. Lazarony, "How to Exterminate Web Creeps," CBS.MarketWatch.com—How to Protect Your Privacy on the Internet, http://www.cbsmarketwatch.com/news/current/brm_generic.htx?source=htx/http2_mw, 4 pages, May 3, 2000.

* cited by examiner

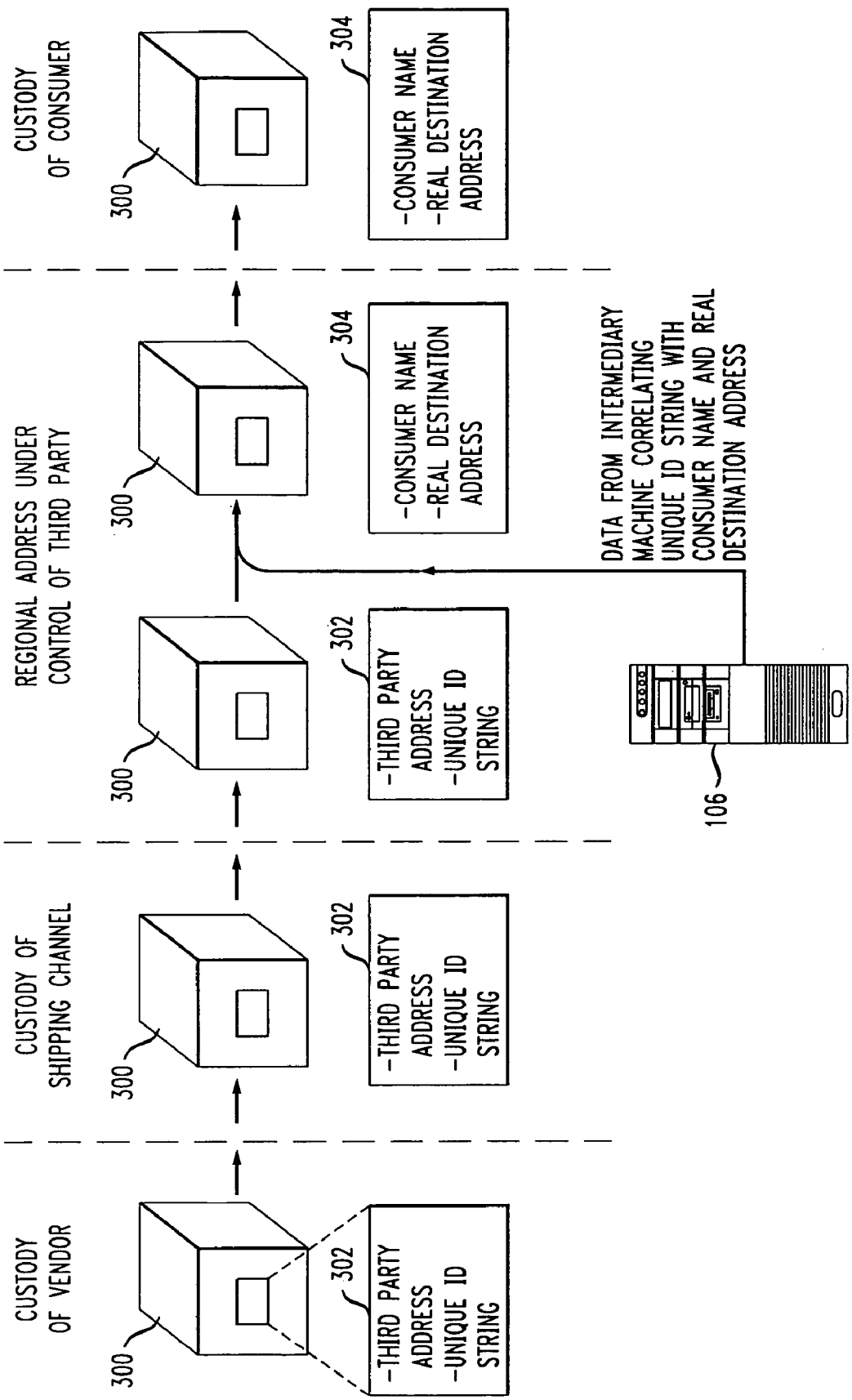

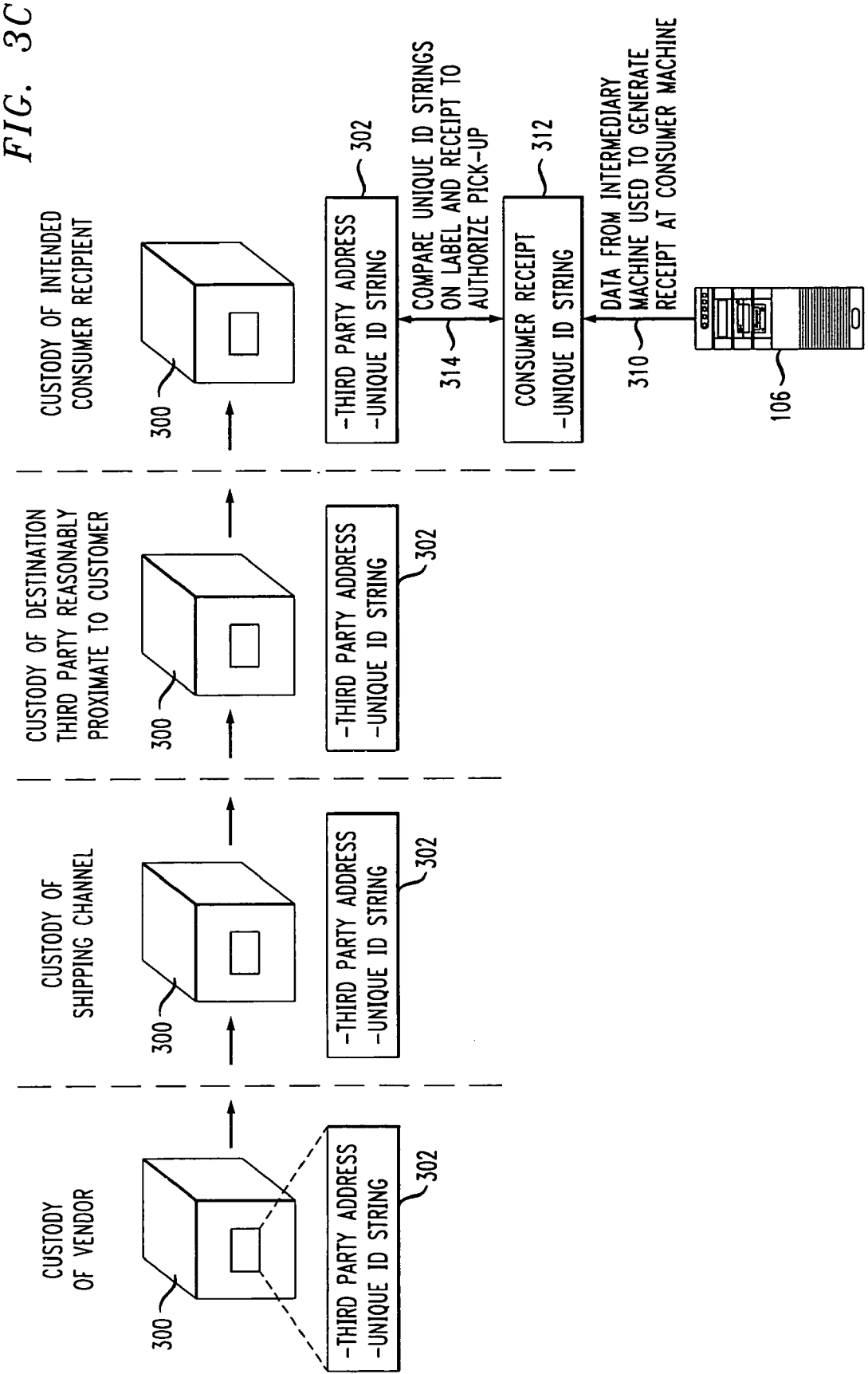

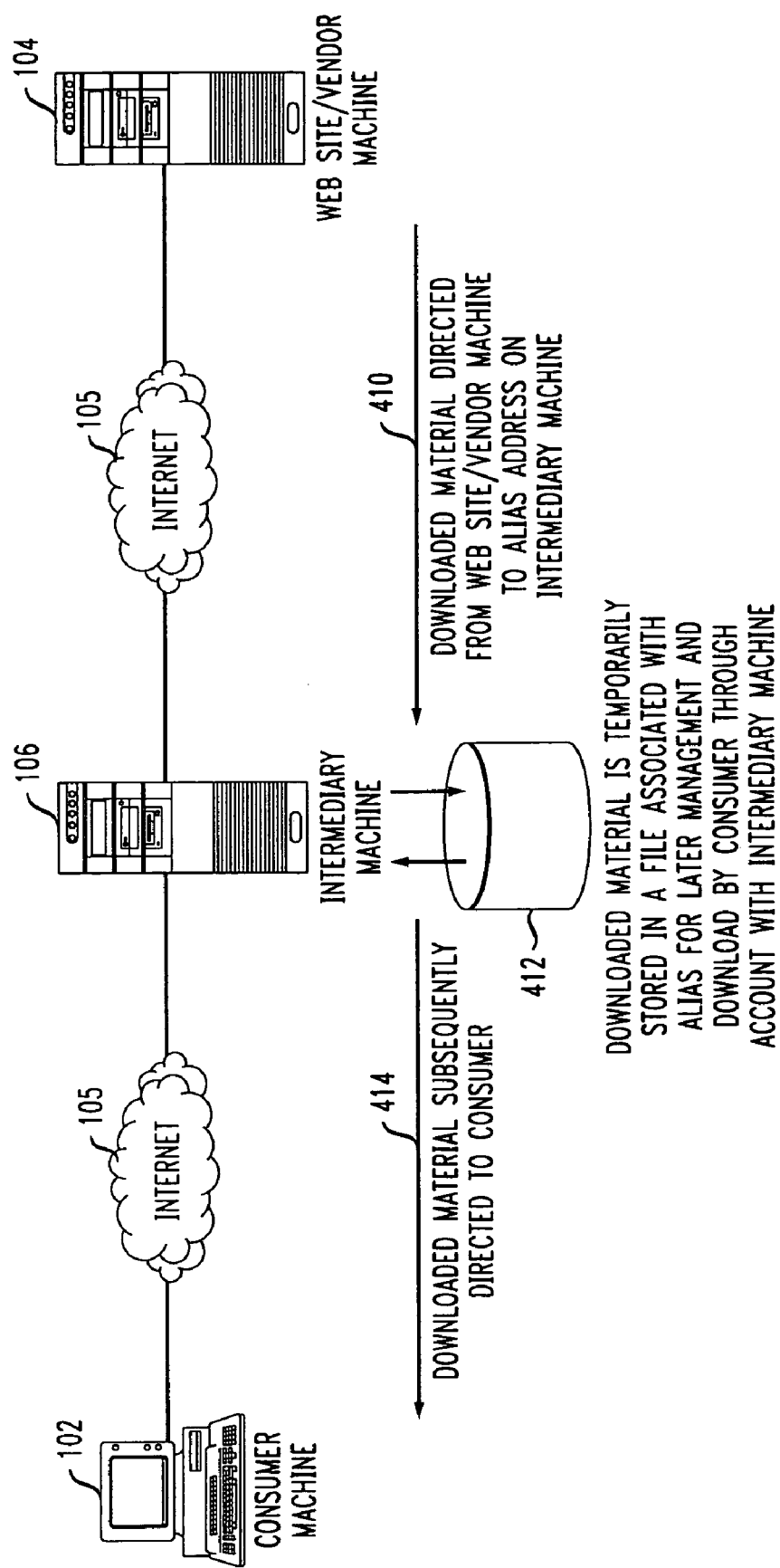

METHODS AND APPARATUS FOR PROVIDING USER ANONYMITY IN ONLINE TRANSACTIONS

CROSS-REFERENCE TO RELATED APPLICATION(S)

This application is a continuation of U.S. application Ser. No. 09/510,919 filed on Feb. 22, 2000 now U.S. Pat. No. 7,203,315, the disclosure of which is incorporated herein by reference.

FIELD OF THE INVENTION

The present invention relates generally to techniques for providing user anonymity in communications over the Internet or other computer networks, and more particularly to techniques for providing user anonymity in conjunction with electronic commerce and other online transactions conducted over such networks.

BACKGROUND OF THE INVENTION

Increasing use of the Internet has created new and expanded concerns relating to security of personal information disclosed by consumers or other users in the course of online transactions. For example, online purchase transactions often require a consumer to disclose potentially sensitive personal information to the corresponding web site operator or vendor. Such information generally includes the name, address and payment card number of the consumer, but may also include more sensitive information such as passwords, date of birth, social security number, drivers license information, mother's maiden name, bank account information, etc.

Disclosure of such information to multiple online vendors or other web site operators, e.g., by entering into a series of transactions with different web site operators over a period of time, substantially increases the likelihood that such information will be misappropriated and lead to fraud, identity theft or other undesirable consequences for the consumer.

Another problem associated with the disclosure of personal information to web site operators is that the operators may make use of the personal information in a manner that the consumer may well consider unacceptable. Currently, web site operators routinely place a "cookie" on the consumer's machine during an initial web session. The cookie is often correlated with a consumer profile developed in the operator database, such that information freely given by the consumer can be combined with other information either deduced from the consumers actions during a web session, e.g., purchasing patterns or other behaviors, or combined with other profile information, available from other parties, that can be matched up with one or more identifying characteristics of the consumer, such as name, address, etc. And, with such cookies in place, a web site operator can identify consumers as they re-visit the site and thereby provide more directed content, marketing or other offers to the consumer. More recently, online profiling has reached new heights in obtaining information about consumers online, as well as combining such information with data obtained in the offline world. While there are certain benefits to the consumer resulting from such profiling, e.g., personalized marketing resulting in better offerings to consumers, it is at the expense of the uncontrolled proliferation of databases containing what in many cases may be confidential information about the consumer.

One approach to providing protection of personal information in online transactions is through the use of so-called "anonymous currency." This approach generally incorporates cryptography-based authentication verification processes, and allows electronic currency to be passed between entities without the disclosure of personal information. A consumer can thus make a purchase online by transmitting to an online vendor electronic dollars having a verifiable value but carrying no personal information regarding the consumer. Although this approach is technically feasible, it suffers from a number of significant drawbacks. For example, anonymous currency generally requires specialized devices at various points in the transaction processing path, such as at the consumer and vendor machines. Many consumers and vendors are understandably reluctant to invest in this new infrastructure without some assurance of widespread adoption by others, i.e., a "critical mass" of adoption.

A second problem with anonymous currency is that there are multiple competing anonymous currency protocols, each with their own backers and benefits, all vying for the opportunity to be adopted as a standard. Thus, independent of any specific technical merit of the approach, the industry has been unable to reach agreement on a particular anonymous currency protocol, and as a result the needed infrastructure has not been deployed by consumers and vendors.

Another approach has been to attempt to develop an online payment card clearinghouse mechanism analogous to that used for offline transactions. An example of this approach is the Secure Electronic Transactions (SET) protocol proposed by VISA and MasterCard. The SET protocol utilizes digital certificates to verify that customers are authorized to use corresponding payment cards for online transactions and that merchants are authorized to accept such cards. The SET protocol has been described at http://www.visa.com/nt/ecomm/security/set.html as "the electronic equivalent of a consumer looking for a Visa decal in a merchant's store window, and a merchant checking the consumer's signature on the back of a Visa card." The SET protocol also provides for the protection of consumer payment information through the use of encryption. However, as another broad-based infrastructure solution, SET suffers from problems similar to those of anonymous currency, i.e., a hurdle of critical mass adoption, and difficulty in resolving standards issues relating to industry adoption of new protocol.

Given the problems associated with the above-described anonymous currency and payment card clearinghouse approaches, the escalation of electronic commerce has been enabled in part by another approach, known as the secure socket layer (SSL). SSL is an Internet protocol which creates a secure session key to protect communications between a server, e.g., a host web site, and a client, e.g., a browser running on a consumer machine. SSL protects information transmitted over an otherwise insecure channel from unauthorized surveillance or eavesdropping. With the protection afforded by SSL, consumers have shown greater willingness to provide their personal information over the Internet for the purposes of online transactions. Unfortunately, although SSL does secure the communication link over which the personal information is transmitted, it does not protect that information in any way once it emerges at its destination, i.e., the web site server. Accordingly, vast amounts of personal information have continued to accumulate in an unprotected manner in the databases maintained by web site operators.

Consumers are becoming increasingly aware of the problem posed by the accumulation of their personal information by web site operators. See, e.g., "Privacy: Outrage on the Web," Business Week, pp. 38-40, Feb. 14, 2000, and Q.

Hardy, "Window Shopping," Forbes, pp. 62-64, Jan. 24, 2000. In addition, hackers have recently engineered high-profile thefts of payment card numbers and other consumer personal information from web site operator databases, thereby making the problem even more apparent to consumers.

Although a number of anonymity services have been developed to provide anonymous web browsing, such services generally fail to extend anonymity into the context of purchases or other online transactions, and thus fail to solve the problems associated with personal information being stored by web site operators. Examples of such anonymity services include the Enonymous™ advisor from enonymous.com, http://www.enonymous.com, and the Freedom™ product from ZeroKnowledge, http://www.freedom.net. These and other similar services generally allow a user to protect their personal information during web browsing. However, once a user wants to enter into a transaction at a given web site, e.g., to purchase an item for delivery or download, that user must give up his or her anonymity and deliver personal information to the web site operator in a conventional manner, e.g., via an SSL connection. The personal information so delivered is then subject to the problems previously described. Moreover, once the personal information has been delivered, the web site operator can make a connection between the alias and the actual user, such that the user will need to select another alias in order to ensure anonymity for future browsing activities.

Accordingly, what is needed are techniques for providing end-to-end user anonymity for online transactions, such that users need not be required to disclose personal information to multiple web site operators in order to enter transactions with those operators. Such techniques should also be implementable without the need for infrastructure changes or new standards that require a certain critical mass point for adoption.

SUMMARY OF THE INVENTION

The present invention provides end-to-end anonymity techniques that maintain user anonymity even when a user desires to enter an online transaction involving purchase and receipt of goods or services.

In accordance with the invention, user anonymity is provided by an intermediary machine configured to mediate communications between a user machine and multiple web site operator machines in a network. An association is established in the intermediary machine between real identity information for a particular user, e.g., a user name, a user electronic address, a user shipping address, and a user credit card or other payment card number, and corresponding alias identity information for the user, e.g., a user alias, an alias electronic address, and an alias profile characteristic. At least a portion of the alias identity information is supplied from the intermediary machine to a given web site operator machine in conjunction with an action by the user, e.g., a portion of the alias identity information may be supplied to the web site operator machine in conjunction with a request of the user for access to the corresponding web site. All communications between the user machine and the web site operator machine may be directed through the intermediary machine, such that the web site operator machine never receives the user's real identity information.

When the user desires to enter an online transaction with the web site operator, the intermediary machine provides intermediary payment authorization information to the web site operator machine, such that the user is able to enter into the transaction without the real identity information being disclosed to the web site operator. This intermediary payment authorization information may be supplied to the web site operator machine in response to receipt of a corresponding authorization from the user. The intermediary payment authorization information may include, e.g., a payment card number of an entity associated with the intermediary machine and a corresponding authorization to charge an amount associated with the online transaction to the payment card number.

In accordance with another aspect of the invention, the intermediary machine in conjunction with the online transaction supplies an alias physical or electronic destination address to the web site operator machine for use in delivery of goods or services purchased by the user as part of the transaction.

In the case of physical goods requiring delivery, the alias destination address may be, e.g., an address of a third party destination determined by the intermediary to be in sufficient proximity to a real destination address of the user, such that the physical goods purchased by the user as part of the transaction are delivered by the web site operator to the third party destination address. In this case, data from the intermediary machine correlating a unique identifier on a label of a package containing the goods with a real name and destination address of the user may be utilized to re-label the package while the package is in the custody of a shipping channel, such that the re-labeled package is delivered to the destination address of the user.

As another example, the above-noted correlating data from the intermediary machine may be utilized to re-label the package while the package is in the custody of an entity associated with the third party destination, such that the re-labeled package is delivered to the destination address of the user.

As yet another example, the correlating data from the intermediary machine may be utilized by the user to generate a receipt which authorizes the user to pick up the package at the third party destination.

The alias destination address may alternatively be an electronic destination address specified by or otherwise associated with the intermediary machine, such that goods in the form of downloadable material purchased by the user as part of the transaction are delivered by the web site operator to the electronic address. In this case, the downloadable material may be redirected by the intermediary machine to a user machine, or temporarily stored in a storage device associated with the intermediary machine until such time as the user directs delivery of the material to a designated user machine.

In accordance with another aspect of the invention, a number of techniques are provided for limiting fraud risks for the intermediary. In one such technique, the intermediary utilizes a large number of payment card numbers or other payment mechanisms, all having different expiration dates. By way of example, the intermediary might have 365 payment card numbers for use within a given year, each expiring a day after the next, such that if a payment card number used on a particular day is misappropriated, the liability with respect to that card ends the next day when the card expires. This rotating expiration mechanism can be extended to even finer periods of time, such as an hour, in order to provide further limitation of the intermediary fraud risks.

Another technique for reducing fraud risk is for the intermediary to interface its transaction database with a credit clearing infrastructure, e.g., via a connection with a credit-granting member bank, in order to compare transactions for authorization. This comparison may be implemented in conjunction with batch or real-time processing.

Yet another possible technique that the intermediary could use to reduce its fraud risk is to migrate vendor relationships to direct payment methods, such as direct per-transaction billing, monthly invoice, etc. For example, an intermediary which does a large number of transactions with a particular web operator may propose that the operator simply bill the intermediary weekly or monthly for the aggregate amount of the transactions during that period.

It is also possible for the intermediary to limit fraud risk by identifying classes of trusted online vendors, and using this information to differentiate the level of risk and thereby the type of card or payment mechanism used. For example, higher limit cards may be used with trusted web operators, while lower limit cards are used for those web operators for which the intermediary has not yet developed a transaction history.

Advantageously, an end-to-end anonymity service in accordance with the present invention completely avoids the need to deliver personal information to a web site operator when entering an online transaction with that operator. In addition, it eliminates the problems of conventional anonymity services which allow a web site operator to make a connection between a consumer alias and the real consumer identity information once the consumer enters a transaction. Moreover, it can be implemented without the adoption of new standards or other significant changes in network or payment clearing infrastructure.

BRIEF DESCRIPTION OF THE DRAWINGS

FIGS. 3A through 3D show examples of possible implementations of an anonymous shipping feature of the present invention.

FIGS. 4A and 4B show examples of possible implementations of an anonymous downloading feature of the present invention.

DETAILED DESCRIPTION OF THE INVENTION

Figure 1:
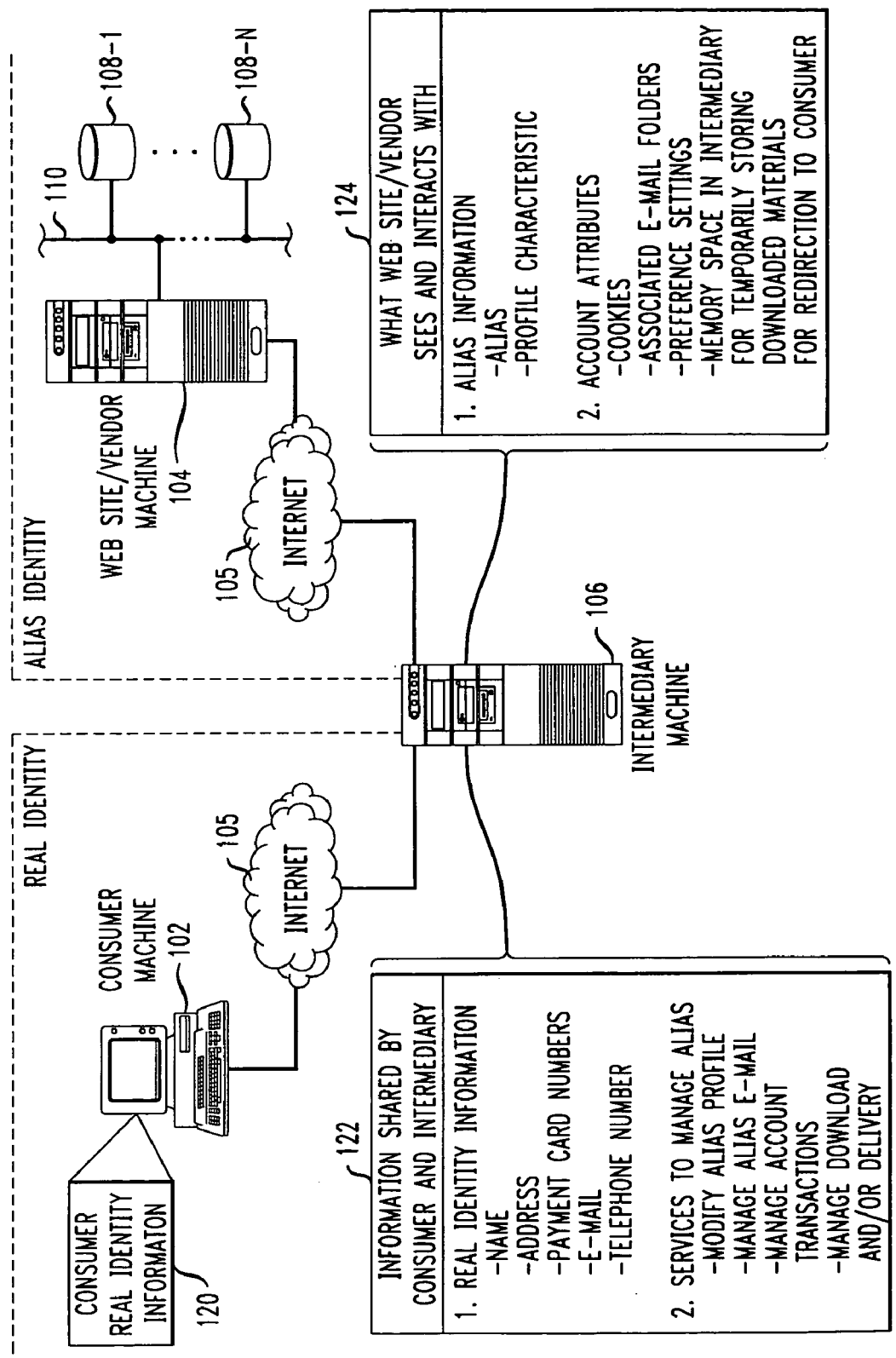
FIG. 1 shows an illustrative embodiment of an online transaction system with end-to-end user anonymity in accordance with the invention.

FIG. 1 shows an illustrative embodiment of the invention. The invention in this illustrative embodiment is in the form of an Internet-based online transaction system 100 which provides complete end-to-end user anonymity, even in the context of online transactions. The system 100 is configured to provide not only anonymous Internet browsing services, but also complete anonymity for those users desiring to enter online transactions with online vendors or other web site operators. More particularly, users of the system 100 are not required to abandon their anonymity once they enter an online transaction with a web site operator. As will be described in greater detail below, the system 100 allows users to enter such online transactions without their personal information ever being disclosed to the web site operators. The invention thus solves the misappropriation problems of the prior art, and as will become apparent does so in a manner which does not require the adoption of new infrastructure.

The system 100 of FIG. 1 includes a consumer machine 102 and a web site/vendor machine 104, both connected to the Internet 105. Also connected to the Internet 105 and arranged between the consumer machine 102 and the web site/vendor machine 104 is an intermediary machine 106. All communications between the consumer machine 102 and the web site/vendor machine 104 are directed through the intermediary machine 106 as shown, and may utilize conventional network connections such as, e.g., SSL connections.

The web site/vendor machine 104 may have associated therewith a set of one or more databases $108\text{-}i$, $i=1, 2, \ldots N$, which are accessible to the web site/vendor machine 104 via a network 110. The databases $108\text{-}i$ may include, e.g., information compiled from interactions with consumers or other users, information derived from external sources, or various other combinations and arrangements of these and other types of information. The web site/vendor machine 104 is also referred to herein as a web site operator machine. The term "web site operator" as used herein is intended to include, by way of example and without limitation, an online vendor or other entity controlling or associated with any type of web site or other information source accessible over the Internet or other network.

It should be noted that the particular arrangement of machines as shown in FIG. 1 is for purposes of illustration only, and is not intended to limit the scope of the invention in any way. For example, it should be understood that the web site/vendor machine 104 and the intermediary machine 106, although each is shown illustratively as a single server, may more generally be implemented as any number of servers or other types of computers or other processing devices, in combination with other suitable storage, transmission, routing, networking and processing elements, in any of a wide variety of well-known configurations.

Similarly, the consumer machine 102, although illustratively shown as a desktop personal computer (PC), may be any other type of conventional processing device capable of establishing a connection over a network, such as a laptop or palmtop PC, personal digital assistant (PDA), wireless telephone, etc. In addition, the system 100 may of course include multiple consumer machines, multiple web site/vendor machines and multiple intermediary machines, as well as other supporting hardware and software elements as required for a particular application. As an example, the consumer machine 102 may represent one or more machines in a set of machines in a local area network (LAN) or other arrangement through which a consumer is provided with access to the Internet. These and other arrangements may provide a consumer with access to the intermediary machine through a conventional account service. As another example, one or both of the web site/vendor machine 104 and the intermediary machine 106 may be implemented as conventional server farms, each including multiple servers and supporting equipment.

The term "machine" as used herein is thus intended to include, by way of example and without limitation, any type of computer, server or other data processing device, or any set or other arrangement of multiple such devices, that may be configured to provide the described processing functions.

The intermediary machine 106 operates to protect real identity information 120 associated with the consumer, by maintaining in the illustrative embodiment an associated alias identity with various profile fields and characteristics analogous to those of a real consumer. The intermediary machine 106 thus maintains both the real identity information and alias identity information for a given consumer.

The information 122 shared by the consumer machine 102 and the intermediary machine 106 includes real identity information, such as, by way of example and without limitation, consumer name, post office mailing address, payment card numbers, e-mail address, telephone number, etc.

The term "payment card" as used herein is intended to include, by way of example and without limitation, a credit card, a debit card, a check card, other types of card accounts, as well as other types of payment mechanisms. The existing payment card clearing infrastructure for online transactions currently supports payment cards such as credit cards, debit cards, check cards and other card accounts that are acceptable to the VISA/MasterCard network. The use of such payment cards and their submittal for a transaction in the online world is typified in what is commonly known as a "card not present" transaction. In such a transaction, a card-holding consumer submits the card holder name, card account number, billing address and card expiration date, and this information is used in obtaining approval for the transaction. It should be noted, however, that the invention is not restricted to use with payment cards supported by this existing infrastructure.

The information 124 which is maintained by the intermediary machine 106 and made available via the intermediary machine 106 to the web site/vendor machine 104 includes alias information, such as, by way of example and without limitation, the consumer alias and a corresponding profile characteristic, as well as account attributes such as cookies, associated alias e-mail folders, preference settings, intermediary machine memory space or corresponding location designations for temporary storage of downloaded materials, etc. The information 124 may thus include any information that the consumer is willing to share with third parties on an anonymous basis, e.g., demographic profile data, specific likes and dislikes, various tracking mechanisms such as the above-noted cookies placed by the web site/vendor machine in order to track the consumer, etc.

Accordingly, as the consumer browses the Internet and visits a vendor web site, the web pages and other information served by the corresponding machine 104 pass through the intermediary machine 106 and are received by the consumer machine 102. However, any data that might otherwise be placed on the consumer machine 102 beyond the presentation of web pages for viewing by the consumer, such as tracking mechanisms including but not limited to cookies, are stopped at the intermediary machine 106 and maintained at the intermediary machine 106 in association with the alias identity of the consumer. Thus, the consumer is able to browse and view web pages on the Internet, and the associated web site/vendor machines will only see the consumer as the alias profile and associated data maintained at the intermediary machine 106.

The system 100 as described to this point provides a number of substantial benefits to the consumer. For example, the consumer can participate in the positive benefits associated with web site/vendor development of profiles related to the behavior, use and/or purchasing habits of the consumer, but such profiles are only tied to the consumer by virtue of the alias maintained on the intermediary machine 106. As the consumer browses the Internet through the intermediary machine 106, the consumer is recognized by the web site/vendor machine 104 as the alias and associated profile, but the web site/vendor machine 104 does not know the consumer's true identity and related information.

Another benefit is that through answering various questions or pre-profiling surveys, the consumer can create his or her own alias identity in anticipation of visiting particular sites, such that any one-to-one marketing is even further enhanced by the additional information provided. The consumer is generally more willing to participate in such pre-profiling because it is anonymous and correlation between the alias profile and true identity of the consumer is not available to the web site/vendor machine.

As noted previously, the system 100 also provides an end-to-end anonymity service by allowing the consumer to maintain the benefits described above even when entering an online transaction with a particular online vendor or other web site operator. This aspect of the system 100 will now be described in more detail with reference to FIG. 2.

Figure 2:
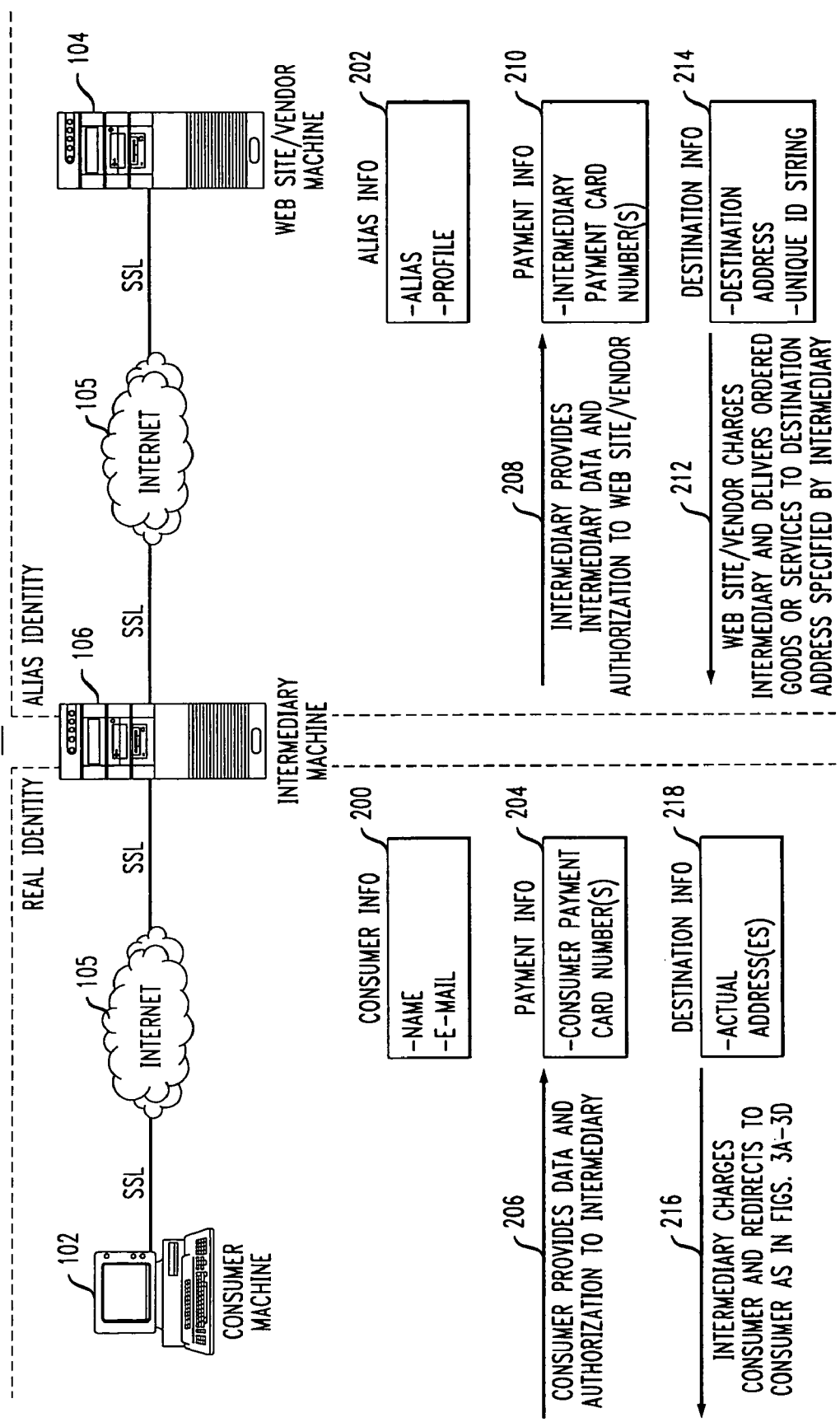
FIG. 2 illustrates information flow in the system of FIG. 1 for an example online transaction carried out in accordance with the invention.

FIG. 2 illustrates the flow of information between the consumer machine 102, the intermediary machine 106 and the web site/vendor machine 104 in a situation in which the consumer wishes to enter into an online transaction with the web site/vendor machine 104. It is assumed for this example that the connections used to transfer sensitive information between the customer machine 102, the intermediary machine 106 and the web site/vendor machine 104 are conventional SSL connections, although other types of connections could also be used.

As previously noted, the intermediary machine 106 maintains as part of the consumer's real identity a set of consumer information 200 including, e.g., the real consumer name and e-mail address. The intermediary machine 106 also maintains and may make available to the web site/vendor machine 104 a set of alias information 202 including, e.g., the alias and corresponding profile. When the consumer wants to make an online purchase from the web site associated with the web site/vendor machine 104, the consumer provides payment information 204 to the intermediary machine 106 as indicated in step 206. This includes authorization for the intermediary to charge a consumer payment card number for the transaction. The payment card number or other portion of the payment information 204 may have been provided to the intermediary machine 106 at some time prior to the consumer sending the authorization, e.g., at a time when the consumer establishes an account with the intermediary. The data transmitted in step 206 may thus include a consumer selection of one of a number of previously-entered payment card identifiers.

The intermediary machine 106 then provides in step 208 a set of intermediary payment information 210 to the web site/vendor machine 104. This information in the illustrative embodiment includes an intermediary payment card number, but may be any other type of payment information or mechanism which is acceptable to the web site operator, e.g., private account information for an account previously established between the intermediary and the web site operator.

The web site/vendor machine 104 in step 212 charges the intermediary, e.g., the intermediary payment card or private account, and the goods or services are then delivered in accordance with destination information supplied by the intermediary. For example, in the case of goods purchased for physical delivery, the goods may be delivered to a third party physical destination address as specified in destination information 214 received from the intermediary machine 106. The destination information 214 may thus include an intermediary-specified destination address, e.g., an alias address or other type of address associated with or otherwise specified by the intermediary. A unique identifier string may be used to associate the particular goods or services with the corresponding transaction.

In the case of electronic goods or services, such as software, music, subscriptions to online access services or content sites, or other types of downloadable material which may be purchased over the Internet, the destination information 214 may include an e-mail address, file address or other type of electronic destination address associated with or otherwise specified by the intermediary. The term "electronic destination address" as used herein is intended to include, by way of example and without limitation, e-mail addresses, file addresses, network addresses or any other information specifying a destination location for deliverable electronic information.

Step 216 indicates that the intermediary machine 106 charges the consumer for the purchase, using the payment information 204, and then redirects the delivery of the goods or services to an actual consumer physical or electronic destination address as specified in the destination information 218. The consumer may include multiple addresses in the destination information 218, and select a particular address and delivery method upon entry into a given online transaction. For example, in the case of goods requiring physical delivery, the consumer may select a delivery method of a type to be described below in conjunction with FIGS. 3A through 3D. In the case of downloadable material, the consumer may select a delivery method of a type to be described below in conjunction with FIGS. 4A and 4B. Purchased services, such as subscriptions to online access services or content sites, may be delivered in a manner analogous to other types of downloadable material such as music or software.

It is generally desirable that the intermediary machine 106 be configured to charge the consumer payment card number before authorizing payment to the web site/vendor machine 104. As an example, intermediary machine 106 may request the performance of a check through the appropriate payment card clearing infrastructure, so as to ensure that the consumer payment card has sufficient credit limit to accommodate the purchase. This credit check may be initiated by the intermediary machine 106 as soon as the consumer enters into the transaction. The intermediary machine 106 may provide a suitable notice to the consumer if a response received from the payment card clearing infrastructure indicates that the spending limit will be exceeded or the payment card is otherwise unable to support the transaction, and may, e.g., allow the consumer to select or enter another payment card number.

It should be emphasized that the anonymous online transaction arrangement illustrated in FIG. 2 can be applied to any type of goods or services that may be purchased or otherwise obtained over the Internet. The term "online transaction" as used herein is thus intended to include, by way of example and without limitation, any situation in which goods or services are obtained in conjunction with the exchange of information over a network. The term "goods or services" is intended to include, by way of example and without limitation, physical goods or services as well as downloadable material or any other type of information accessible over a network.

Moreover, it should be understood that the particular sequence of information flows illustrated in FIG. 2 is by way of example only, and numerous alternative arrangements may be utilized.

The above-described illustrative embodiment of the invention provides the substantial benefit of an end-to-end anonymity service to the consumer. Advantageously, it completely avoids the need to deliver personal information to a web site operator when entering an online transaction with that operator. In addition, it eliminates the problems of conventional anonymity services which allow a web site operator to make a connection between a consumer alias and the real consumer identity information once the consumer enters a transaction.

A more detailed step-by-step example of an online transaction carried out through the system 100 will now be described. First, the consumer browses online through the intermediary machine 106, and finds an item or service to purchase, at which point an SSL connection is desirable. The consumer then proceeds to a "checkout line" of the web site, e.g., a series of web pages or other type of data entry fields designed to solicit necessary payment information, to present final payment terms and to request delivery information, among other information. In the case of a payment card, information typically required by the web site operator includes the payment card number, the card holder name, billing address, and expiration date.

In accordance with the invention, at the point at which the consumer reaches the checkout line web pages, the intermediary machine 106 recognizes the initiation of an online purchase transaction. The intermediary machine 106 then presents to the consumer at the consumer machine 102 a series of dialogue windows which mediate the transaction between the consumer machine 102 and the web site/vendor machine 104. The intermediary machine 106 proceeds to obtain or, if such information is already stored in association with the consumer's account with the intermediary machine, seek selection of the credit account to be used in the transaction.

As previously noted, other information the intermediary machine might solicit from the consumer may include a shipping destination address, in the case of purchased goods of a physical nature requiring delivery. In the case of software, music files or other downloadable material to be delivered to the consumer over the Internet, the intermediary machine 106 may prompt the consumer for an e-mail address, file address or other electronic destination address to which such downloadable material is to be redirected. Like the above-noted consumer payment card information, the destination addresses may also be part of a set of real identity information previously provided to the intermediary, e.g., as part of an account set-up process.

After obtaining sufficient information from the consumer, the intermediary machine is in a position to obtain approval or payment through an existing payment card clearing infrastructure for purchase of goods or services selected by the consumer. The intermediary machine therefore completes the series of "checkout line" web pages of the vendor site using the intermediary machine's payment information, e.g., the payment information 210, such that the vendor is in effect obtaining payment from the intermediary. Accordingly, the vendor site would receive, in this example, a payment card number, the card holder of which may be the intermediary or an associated entity, as well as a corresponding billing address and expiration date. Additionally, in the event of physical goods to be delivered, the destination address may correspond to a specified third party address, as will be described in greater detail in conjunction with FIGS. 3A through 3D.

As noted above, from the intermediary machine standpoint, it is generally preferable for the intermediary machine to have first obtained payment approval from the consumer payment card issuer prior to authorizing payment to the web site/vendor machine. The intermediary machine may also choose, through prior agreement with the consumer, to charge the consumer a service fee, e.g., a percentage of the purchase price, for the anonymity services provided.

At this point the intermediary machine now has the option to also provide for the anonymous shipment or delivery of purchased goods or services by providing, in the associated destination address requested by the vendor, an address which is not the consumer's real destination address, but is instead an address under the control of or otherwise associated with the intermediary. As noted previously, also associated with the online transaction is a unique identifier string tying the subject goods or services to the consumer's alias and, by association between the alias and the consumer's real identity as maintained at the intermediary machine, ultimately the consumer. This unique identifier string may be, e.g., the vendor's tracking number, or it could be a unique identifier string supplied entirely by the intermediary machine, or it could be a combination of these or other identifiers. As was noted in conjunction with FIG. 2, the unique identifier string allows, e.g., a shipment package to be redirected to the real destination after the package has left the custody of the vendor.

Examples of different types of anonymous shipment in accordance with the invention will now be described in greater detail with reference to FIGS. 3A through 3D. In each of these examples, it is assumed that the online transaction involves purchase of goods requiring physical delivery in the form of a package.

Figure 3A:
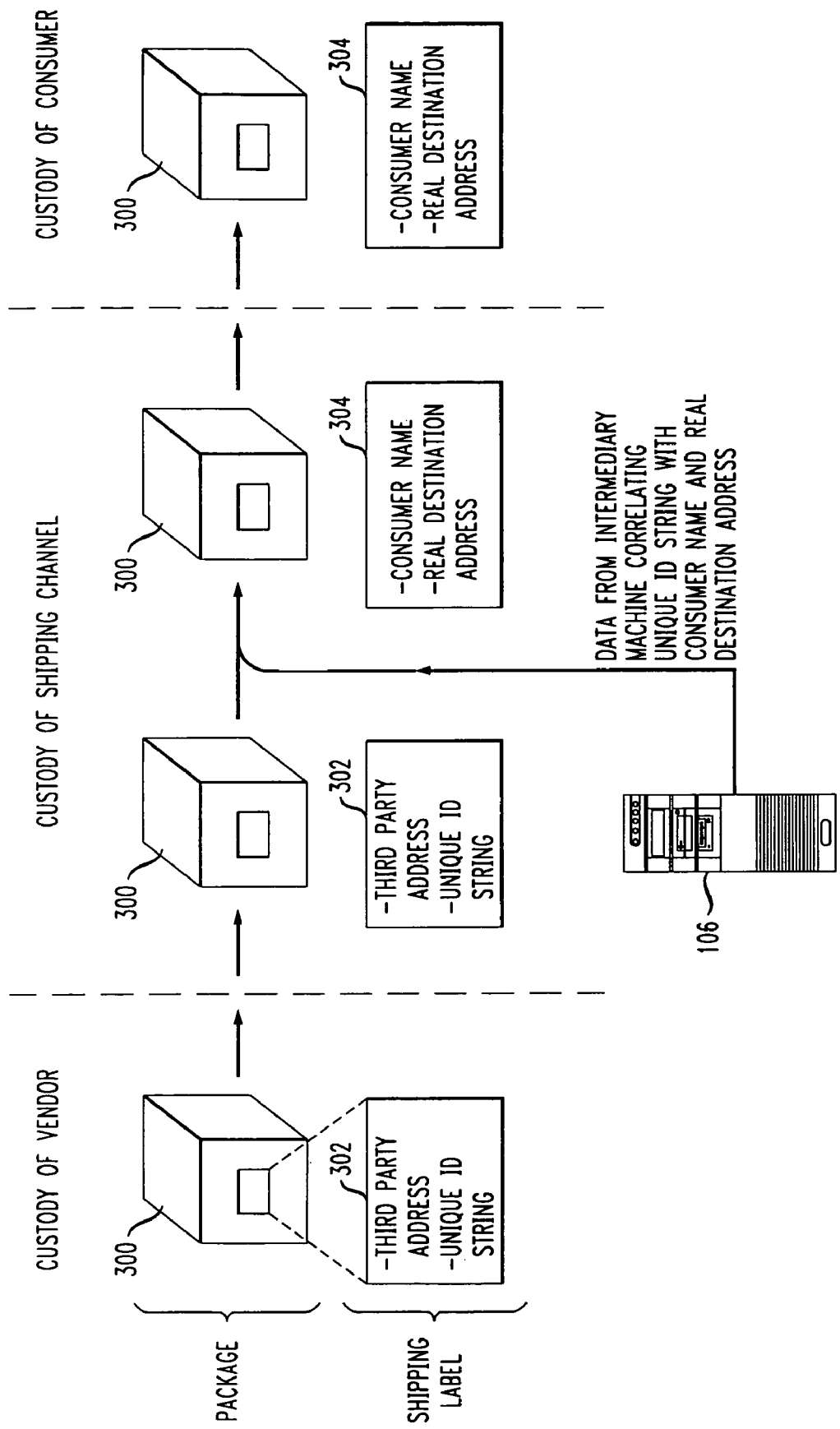

FIG. 3A illustrates an example of anonymous shipping in which the online vendor ships a package 300 to a third party address provided by the intermediary machine 106 in the manner previously described. When in the custody of the vendor, the package 300 includes a shipping label 302 listing the third party address and the unique identifier string, as provided by the intermediary machine 106 in the previously-described online transaction process. The package 300 having the shipping label 302 is delivered by the vendor into the custody of the shipping channel. While in the custody of the shipping channel, data from the intermediary machine 106 is received by an appropriate processing element associated with the shipping channel, and used to correlate the unique identifier string with the real consumer name and real destination address.

The processing element associated with the shipping channel uses the data supplied by the intermediary machine 106 to generate a new shipping label 304 which includes the consumer name and real destination address. The shipping channel then delivers the package 300 to the custody of the consumer using the label 304. The shipping of the package 300 is thus accomplished without the vendor ever receiving the consumer's real identity information.

FIG. 3B shows another example of anonymous shipping in accordance with the invention. In this example, the package 300 with label 302 is passed from the custody of the vendor through the shipping channel to a regional address under control of or otherwise associated with the third party. For example, the regional address may be accessible to the third party by way of arrangement or relationship with an actual owner of the regional address, e.g., a shipping company, courier company or other entity.

While in the custody or indirect control of the third party, data from the intermediary machine 106 correlating the unique identifier string with the consumer name and real destination address is utilized to generate the new shipping label 304. As in the previous example, the new shipping label 304 includes the consumer name and the real destination address, and is delivered in a conventional manner, e.g., via a conventional shipping or courier service, to the custody of the consumer.

The third party address supplied by the intermediary machine in this example and those to be described below may be selected so as to be within reasonable proximity of the real physical destination address. More particularly, since the intermediary knows the real destination address at the time at which the online purchase is made, the intermediary may therefore supply the vendor with a third party address that is most proximate to the real destination address. Hence, a local carrier can be used to complete the delivery.

FIG. 3C shows a further example of anonymous shipping in accordance with the invention. In this example, the package 300 with label 302 is again passed from the custody of the vendor through the shipping channel to the custody or indirect control of a third party within reasonable proximity to the real destination address of the consumer, such that the consumer can pick up the package. However, unlike the previous example, a new shipping label is not generated by the third party in this example. Instead, the original label 302 remains on the package 300, and the consumer utilizes data received from the intermediary machine 106 as indicated at 310 to generate a consumer receipt 312 which includes the unique identifier string also present on shipping label 302. The receipt 312 may also include other indicia to ensure that it was generated from information supplied by the intermediary, such as a digital signature or digital watermark.

The consumer prints out the receipt on a printer associated with the consumer machine 102, and goes to the third party location to pick up the package 300. The third party location may be, e.g., a local office services outlet, such as a Mail Boxes Etc., Kinkos or Staples outlet, a local post office, a local shipping office such as a Fedex or UPS outlet, etc. At the third party location, the consumer presents the receipt, and it is compared as shown at 314 with the shipping label 302 to ensure that the unique identifier strings match and any other required reliability indicia are present. Once the consumer receipt 312 is matched to the label 302, and the reliability indicia are verified, the package is released to the custody of the consumer.

In one possible alternative arrangement of the FIG. 3C example, the consumer receipt 312 may also include a second unique identifier string that is not on the package shipping label, but is associated with the transaction, and can be verified at the point of pick up by the third party turning custody of the package over to the consumer. The second unique identifier string can be compared to information received from the intermediary machine, e.g., via a standard web access, for verification. Also, the consumer receipt may include the consumer's real name, which is not on the package shipping label at this point, so that the third party can verify by photo identification that the correct person is claiming the subject package. Such an arrangement will prevent someone seeing the unique identifier string on the package shipping label from forging a receipt in order to fraudulently claim the package.

Figure 3D:
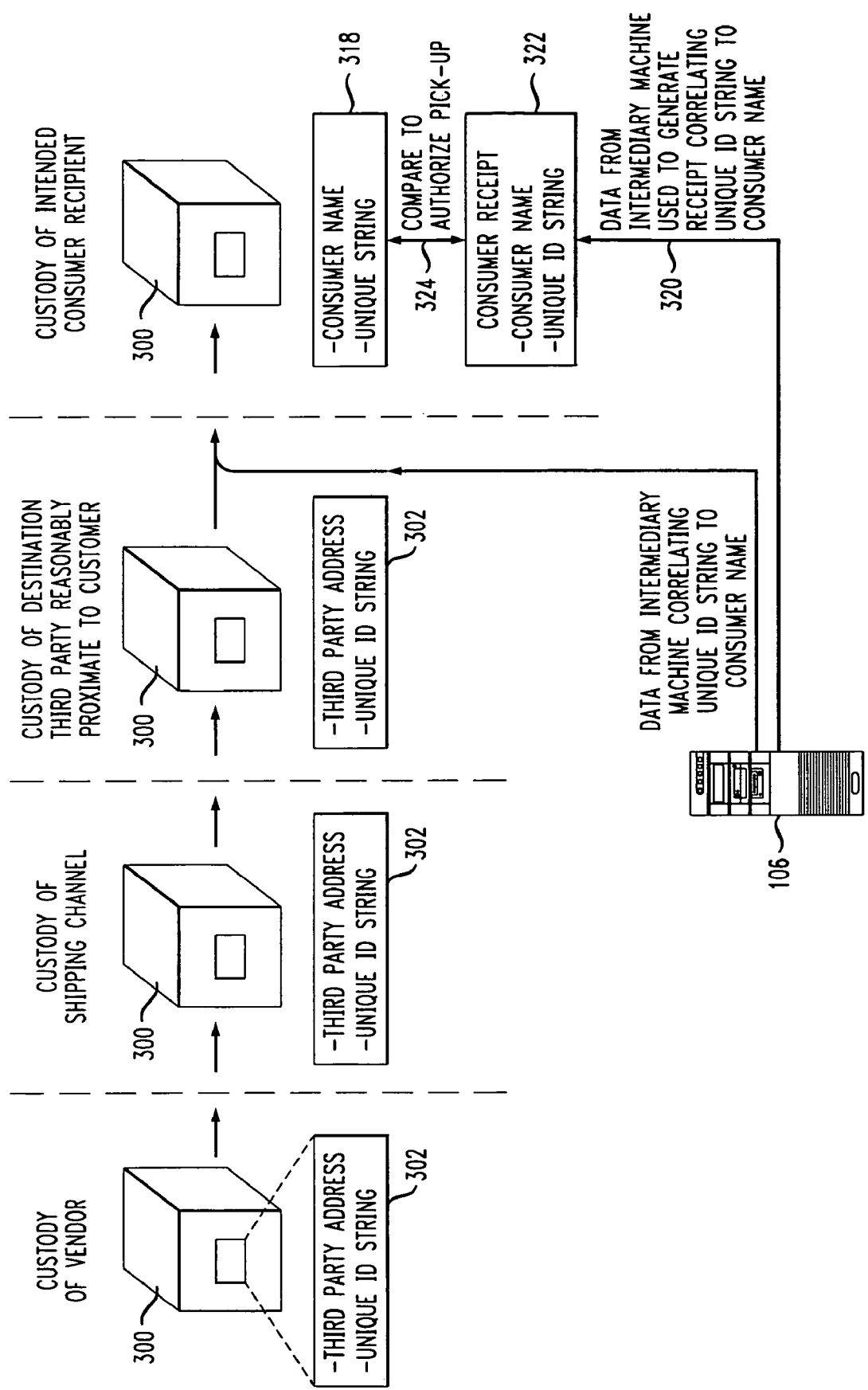

FIG. 3D shows yet another example of anonymous shipping in accordance with the invention. This example is similar to the FIG. 3C example, but in this case the destination third party generates a new label 318 using data from the intermediary machine 106 which correlates the unique identifier string with the real consumer name. The package is then relabeled with the label 318. The consumer receives data from the intermediary machine as indicated at 320, and utilizes the data to generate a consumer receipt 322 which includes the consumer name and the unique identifier string. The consumer prints out the receipt 322 at a printer associated with the consumer machine 102, and goes to the third party location to pick up the package 300. A comparison 324 of the receipt 322 with the label 318 is used to determine if the consumer is authorized to pick up the package. Other reliability indicia, as noted in the previous example, may be used to provide additional security.

The examples of FIGS. 3A through 3D illustrate possible anonymous shipping scenarios for packages requiring physical delivery. It should be understood that these are examples only, and not intended to limit the invention in any way. Other types of anonymous shipping in accordance with the invention include, e.g., an arrangement in which a consumer is simply prompted for and provides an alternate address to which the shipment will be directed. This alternate address may be any address not correlated with the consumer's real identity, such as, e.g., a work address, post office box, friend's house, etc.

As previously noted, the present invention can also provide anonymous delivery of other types of goods and services purchased in online transactions. Examples of anonymous delivery of software or other downloadable material purchased over the Internet will now be described with reference to FIGS. 4A and 4B.

Figure 4A:
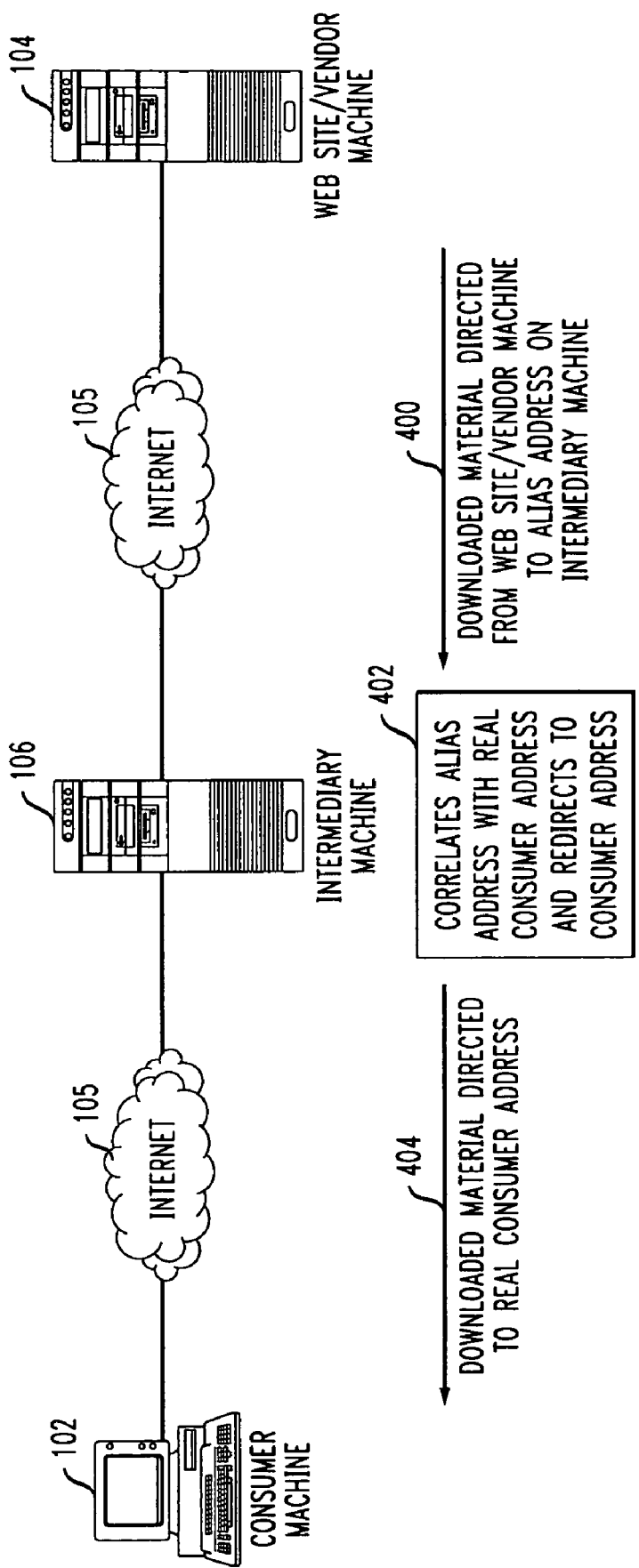

FIG. 4A illustrates an example in which software or other downloadable material is purchased by a consumer in an online transaction. The purchase may be made in the manner described previously in conjunction with FIG. 2, with the consumer providing payment card authorization to the intermediary, and the intermediary supplying its own payment card information to the vendor. The intermediary also supplies a destination delivery address which in this example is assumed to be an electronic destination address, e.g., an alias e-mail or file address established for the consumer on the intermediary machine 106.

As indicated at 400, the web site/vendor machine 104 directs the downloadable material to the alias address on the intermediary machine. The intermediary machine as indicated at 402 correlates the alias address with the real consumer e-mail address or other destination address selected by the consumer, and redirects the downloadable material to the consumer address. The downloadable material is then delivered to the consumer address, e.g., an e-mail address associated with the consumer machine 102. The downloading of the purchased material is thus accomplished without disclosing any of the consumer's real identity information to the vendor.

FIG. 4B shows another example of anonymous delivery of downloadable material in accordance with the invention. As in the previous example, the downloadable material is directed from the web site/vendor machine 104 to the alias address on the intermediary machine, as indicated at 410. The downloaded material is then temporarily stored in a storage device 412 which may be part of or otherwise associated with the intermediary machine 106. The material is stored on the device 412 in a file which is associated with the consumer alias, such that it can be later managed and downloaded by the consumer through a consumer account with the intermediary machine. For example, the consumer can log in to his or her account at any time after the material has been temporarily stored at the intermediary machine, and direct the intermediary machine to deliver the downloaded material to the consumer machine 102. The materials are then delivered by the intermediary machine, as indicated at 414.

It should be noted that the destination machine in the example of FIG. 4B need not be the same machine that was used by the consumer when the downloadable materials were ordered. For example, a consumer may order the downloadable material while online at a machine at work, and direct that the material be stored temporarily by the intermediary machine 106. The consumer can then subsequently login to the intermediary machine 106 from a machine at home and direct that the material be downloaded to the home machine.

An illustrative consumer registration process suitable for use with the system 100 of FIG. 1 will now be described in greater detail. A given consumer or other user, when initializing his or her account with the intermediary machine 106, selects or is provided with a user login name and associated password for logging into the account. Any of a number of well-known remote password login mechanisms may be used for this purpose. The term "user" is intended to include, by way of example and without limitation, consumers that enter online transactions with web site operators, and any other type of individuals or entities that may utilize an anonymity service.

Although the user name may correspond to the previously-described consumer alias, it is generally preferred that the user login name is not the same as the alias. This is because the user login name is often stored in the consumer machine 102 and thus is subject to discovery by invasive software, tracking mechanisms, etc. Discovery of a login name corresponding to the alias would of course undermine the anonymity service. In addition, the account set up by the user may have more than one associated alias, each being selectable by the user, so a login name corresponding to an alias might cause confusion between the login name and other aliases maintained by that user. Furthermore, the end-to-end anonymity service of the present invention may be configured to be portable, i.e., generally does not require a user to login at any particular machine and is accessible from a general purpose browser. The user may therefore be logging into their account from a machine that is not necessarily secure, e.g., a machine at work, at the home of a friend or relative, etc. This is another reason that it is generally desirable to have the user alias or set of aliases distinct from the user login name, and maintained only on the intermediary machine.

After an initial session in which an account is created, the intermediary machine 106 stores the real identity information of the user, e.g., user login name and password, as well as alias information, e.g., alias name(s), alias profile characteristics, etc. The user can then subsequently initiate anonymous sessions by logging into the account. Logging into the account generally involves authenticating the user via the password, although other more sophisticated authentication mechanisms may also be used, such as multi-factor hardware or software based tokens, biometrics, time synchronous association protocols, and various forms of public key authentication security. Additionally, the login process may include the use of an SSL connection or other type of session encryption mechanism established between the consumer machine 102 and the intermediary machine 106, so as to reduce the likelihood that login data transmitted between these machines will be misappropriated.

Associated with the intermediary machine 106 may be a set of databases that store the information required to implement the above-described end-to-end anonymity service. These databases will now be described in greater detail with reference to FIG. 5.

Figure 5:
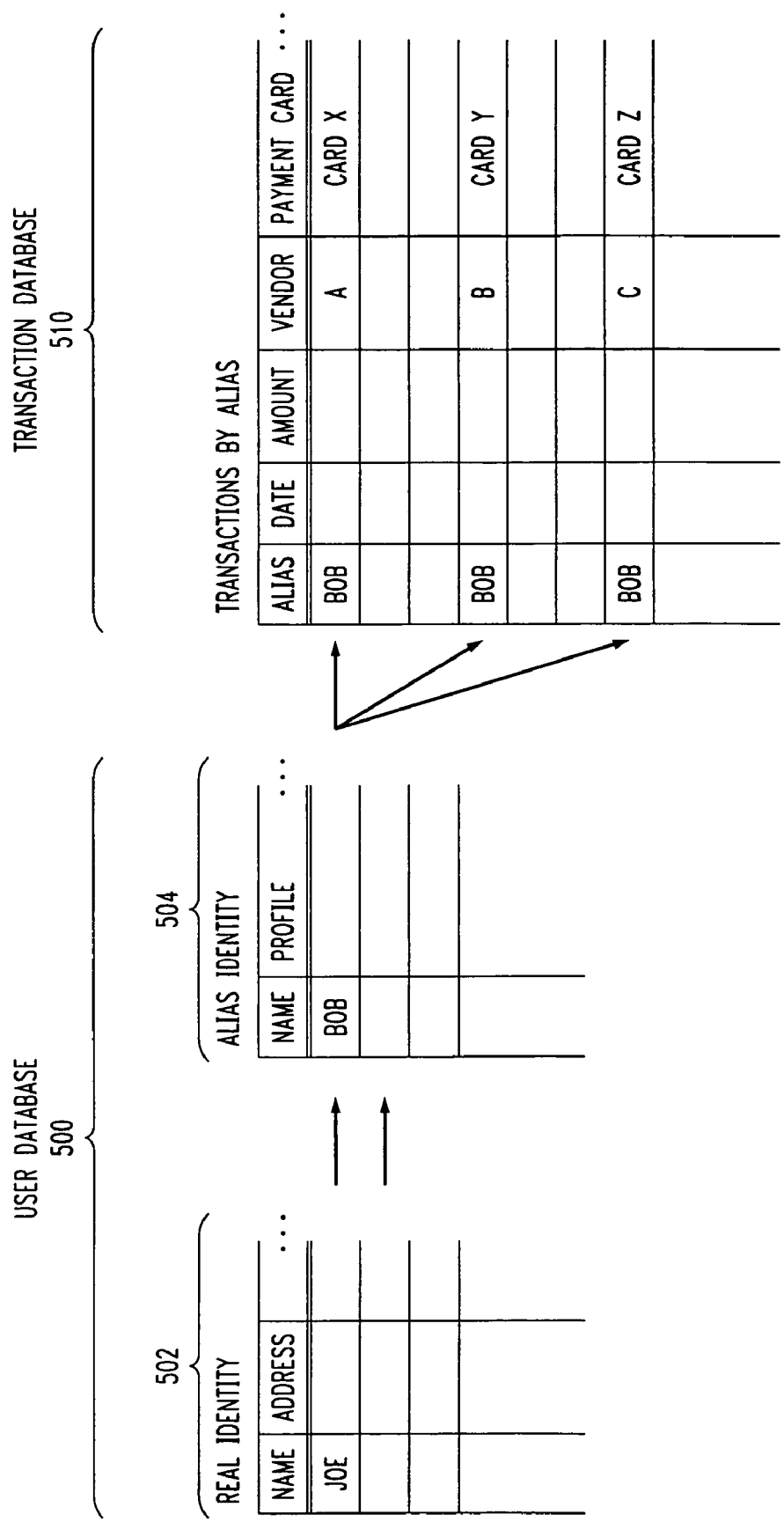
FIG. 5 illustrates interactions between an anonymity service user database and a transactional database in accordance with an illustrative embodiment of the invention.

FIG. 5 shows an example of a set of databases that may be maintained by the intermediary machine 106 or an associated entity. The databases in this example include a user database 500, having a real identity portion 502 and an alias identity portion 504, and a transaction database 510. Each of the databases or portions thereof may represent different files or other storage locations in a single storage device or set of storage devices, or each may represent distinct storage devices or sets of storage devices. The invention does not require the use of any particular type or arrangement of storage devices, and a wide variety of conventional arrangements may be used, e.g., combinations of electronic, magnetic and optical storage devices.

The real identity portion 502 of the user database 500 in this example includes real identity information, such as the real user name, address, etc. Each of the entries in the real identity portion 502 is correlated with a corresponding entry in the alias identity portion 504, which includes the alias information, such as the alias, profile, etc. For example, a user "Joe" in the real identity portion 502 has a corresponding alias "Bob" in the alias identity portion 504.

The transactions database 510 keeps records of the online transactions undertaken by the various aliases, and for each such transaction includes information such as alias, transaction date, transaction amount, vendor identifier, intermediary payment card used, etc. For example, it can be seen from FIG. 5 that the transaction database 510 stores transaction information for three transactions entered by the alias Bob, i.e., a first transaction with a vendor A which was consummated using the intermediary payment card X, a second transaction with a vendor B using the intermediary payment card Y, and a third transaction with a vendor C using the intermediary payment card Z.

It is important that the real identity portion 502 and the alias identity portion 504 be maintained by the intermediary in a manner which ensures that the relationship between the real identity information and the alias identity information remains secure. A number of different techniques may be used to achieve this, such as maintaining separate databases which are connected only for real-time use, or a single database of files in which portions relating to real identity information as opposed to alias identity are accessible only by authorized parties through predetermined protocols.

As previously noted, in the illustrative embodiment, a user having an account with the intermediary logs into the account using the user login name and password. The user is thereby given access to their account information, including both real identity and alias information, only after proper authentication. Similarly, the intermediary or associated entity may have access to the full account information only as required to service the account and only in accordance with the above-noted protocols or other appropriate security arrangements. Thus, at any time in which the subject account is not in active authorized use, the real identity fields and alias characteristics of the account are preferably not correlated for the benefit of a passive observer. Additionally, such account information, whether in a single database file comprised of multiple fields or segregated into separate databases, should preferably be encrypted when not in use. This encryption would ensure that, in the event of an unauthorized access to the files, the information would be unreadable even if correlated.

It should be noted that there are risks incurred by the intermediary machine and its associated entity in providing an end-to-end anonymity service. For example, although having many consumers use the services of the intermediary to purchase online reduces the potential for fraud on those consumers' payment cards, it aggregates the risk for such fraud onto the payment cards or other payment mechanisms of the intermediary. However, the aggregation of many consumers' online transactions through the intermediary machine also, through economies of scale, enables the intermediary to take actions to minimize fraud on its payment cards or other payment mechanisms. The system thus provides an advantage in that such actions are not necessarily available to consumers on an individual basis. Moreover, although suitable for use with many different types of payment mechanisms, the system can implement such actions without any change in an existing credit payment clearing infrastructure.

The invention provides a number of techniques that can be used to limit the above-noted fraud risks for the intermediary. One such technique is that the intermediary, having aggregated market leverage by establishing accounts with a large number of users, can more readily obtain a large number of payment cards or other payment mechanisms and rotate them in a manner such that, even if misappropriated, their further use is limited. The existing payment card clearing infrastructure uses, among other information, the expiration date of the particular payment card or payment mechanism as a means of verifying and approving a transaction. Accordingly, the intermediary could obtain a large number of payment card numbers or other payment mechanisms, all having different expiration dates.

By way of example, the intermediary might have 365 payment card numbers for use within a given year, each expiring a day after the next, such that if a payment card number used on January 10 is misappropriated, the liability with respect to that payment card number ends the next day when the card number expires. This rotating expiration date mechanism can be extended to even finer increments of time, such as an hour, in order to provide further limitation of the intermediary fraud risks. Although such mechanisms are clearly not practical for implementation by an individual, these mechanisms are commercially viable for a single intermediary entity having a large number of consumer accounts.

Another possible technique that the intermediary could use to reduce its fraud risk is to migrate vendor relationships to direct payment methods, such as direct per-transaction billing, monthly invoice, etc. For example, an intermediary which does a large number of transactions with a particular web site operator may propose that the operator simply bill the intermediary weekly or monthly for the aggregate amount of the transactions during that period. The payment information submitted by the intermediary to a vendor of this type could include an identification of the intermediary account along with appropriate authenticating information, such as a pre-established password. The password arrangement may be configured in a rotating manner similar to that described previously in order to provide additional protection.

It is also possible for the intermediary to limit fraud risk by identifying classes of trusted online vendors, and using this information to differentiate the level of risk and thereby the type of payment card or other payment mechanism used. For example, higher limit payment card numbers may be used with trusted web operators, while lower limit payment card numbers are used for those web operators for which the intermediary has not yet developed a transaction history.

In conjunction with the identification of trusted vendors, the intermediary may make use of a variety of existing trust determination mechanisms. Such mechanisms may include, e.g., an evaluation conducted by the intermediary, known reference sources such as BBB online, and domain name registrant information and security services for verifying the authenticity of the domain to prevent spoofing.

The intermediary may also directly interface the transaction database with the credit clearing infrastructure, e.g., via a connection with a credit-granting member bank, in order to compare transactions for authorization. This comparison may be implemented in conjunction with batch or real-time processing.

The existing payment card clearing infrastructure used in online transactions generally includes, among other elements, a merchant bank and a card issuing institution, associated with the web vendor and card-holding consumer, respectively. The merchant bank has a relationship with the web vendor whereby the web vendor, having received payment card information from a consumer, submits that information to the merchant bank. The merchant bank then, through the payment card infrastructure, requests approval of the subject transaction from, at least in part, the card issuing institution. The card issuing institution, having issued the consumer the payment card being used in the transaction, then verifies certain information, including, e.g., the size of the transaction, available credit, whether the card has expired or been canceled, etc.

In accordance with the present invention, a payment card clearing scenario between a consumer and an online vendor is mediated by the intermediary machine 106. The intermediary machine 106 may act as a typical online vendor in processing the transaction through its merchant bank to obtain approval for the transaction from the consumer card holder's issuing bank. The intermediary machine 106 then acts as consumer in relation to the web site/vendor machine 104 by submitting its own intermediary payment card information for processing of the subject transaction. Thus, the end consumer's payment card is charged the transaction amount by the intermediary machine, and the intermediary machine's payment card is charged the transaction amount by the web merchant. Accordingly, the transaction charge is passed through from the web vendor to the consumer, but without the consumer's payment card information being provided to the web vendor, thus preserving the anonymity of the consumer.

Certain efficiencies may be obtained by connecting the intermediary machine to its card issuing institution's approval processor(s). For example, as noted above, this will allow a comparison to be made in real time between the intermediary machine's transaction database and a pending payment card approval. Such real-time interaction reduces the potential for fraud on the intermediary payment card. As previously noted, non-real-time batch processing techniques can also be used to make such a comparison.

Furthermore, although the entity controlling the intermediary machine could be any party, additional economic efficiencies may be achieved when the intermediary machine is controlled by or otherwise associated with an element in the payment card clearing infrastructure, including a payment card issuing institution, a merchant bank, and/or clearing network operator such as VISA or MasterCard. As another example, the intermediary machine may be controlled by or otherwise associated with an online entity such as an Internet service providers (ISP), a web portal, or even a particular trusted web site operator. Regardless of the particular type of entity controlling the intermediary machine 106, a user is provided with significantly improved anonymity protection by storing real identity information with only a single entity. Using the techniques of the invention, users can enter transactions with any number of online vendors or other web site operators without fear of compromising their anonymity.

The present invention has been illustrated herein in conjunction with an exemplary system for providing end-to-end user anonymity in online transactions conducted over the Internet. Although particularly well-suited for use in such a system, the invention is not limited to use with any particular type of system, arrangement of system elements, application, network or network communication protocol. For example, the invention may be applied to anonymity applications which utilize other types of networks, such as, for example, a wide area network, an intranet or extranet, telephone, cable or satellite networks, wireless networks such as cellular or paging networks, as well as combinations or portions of these and other networks. In addition, the invention does not require any particular configuration of user machine, intermediary machine or web site/vendor machine. Furthermore, the invention is not limited to use with payment card numbers or any other particular type of payment mechanism.

The above-described embodiments of the invention are thus intended to be illustrative only. Those skilled in the art will recognize that components of a system in accordance with the invention can be implemented in software, hardware, and various combinations thereof. The invention may therefore be embodied at least in part in the form of one or more software programs, operating in conjunction with hardware such as various arrangements of clients, servers, processors, memory and other storage devices, as well as other elements. Such embodiments of the invention may include a computer readable medium such as a magnetic or optical disk, electronic memory, etc. These and numerous other alternative embodiments within the scope of the following claims will be apparent to those skilled in the art.

What is claimed is:

1. A method of providing user anonymity in conjunction with transactions conducted over a network, the method comprising the steps of:

establishing an association in an intermediary machine between real identity information for a particular user and corresponding alias identity information for the user;

supplying at least a portion of the alias identity information from the intermediary machine to a machine associated with a web site operator in conjunction with an action by the user;

providing intermediary payment authorization information to the web site operator machine in conjunction with an online transaction involving the user, such that the user is able to enter into the transaction without the real identity information being disclosed to the web site operator;

wherein the intermediary machine comprises a processor and a memory, the memory being configured to store a plurality of payment card numbers of differing expirations, and the processor being configured to select a particular one of the plurality of payment card numbers for use as the intermediary payment authorization information based at least in part on an evaluation of the trustworthiness of the web site operator.

2. A processor-implemented method of providing user anonymity in conjunction with transactions conducted over a network, the method comprising the steps of:

establishing an association in an intermediary machine between real identity information for a particular user and corresponding alias identity information for the user;

supplying at least a portion of the alias identity information from the intermediary machine to a machine associated with a web site operator in conjunction with an action by the user;

providing intermediary payment authorization information to the web site operator machine in conjunction with an online transaction involving the user, such that the user is able to enter into the transaction without the real identity information being disclosed to the web site operator;

wherein a transaction database associated with the intermediary machine is interfaced with a corresponding credit clearing infrastructure element so as to facilitate comparison of transactions authorized by the intermediary with transactions reported by one or more web site operators.

3. A processor-implemented method of providing user anonymity in conjunction with transactions conducted over a network, the method comprising the steps of:

establishing an association in an intermediary machine between real identity information for a particular user and corresponding alias identity information for the user;

supplying at least a portion of the alias identity information from the intermediary machine to a machine associated with a web site operator in conjunction with an action by the user;

providing intermediary payment authorization information to the web site operator machine in conjunction with an online transaction involving the user, such that the user is able to enter into the transaction without the real identity information being disclosed to the web site operator;

wherein the intermediary machine in conjunction with the online transaction supplies an alias destination address to the web site operator machine for delivery of goods or services purchased by the user as part of the transaction;

wherein the alias destination address comprises an address of a third party destination determined by the intermediary to be in sufficient proximity to a real destination address of the user, such that physical goods purchased by the user as part of the transaction are delivered by the web site operator to the third party destination address.

4. The method of claim 3 wherein data from the intermediary machine correlating a unique identifier on a label of a package containing the goods with a real name and destination address of the user is utilized to re-label the package while the package is in the custody of a shipping channel, such that the re-labeled package is delivered to the destination address of the user.

5. The method of claim 3 wherein data from the intermediary machine correlating a unique identifier on a label of a package containing the goods with a real name and destination address of the user is utilized to re-label the package while the package is in the custody of an entity associated with the third party destination, such that the re-labeled package is delivered to the destination address of the user.

6. The method of claim 3 wherein data from the intermediary machine correlating a unique identifier on a label of a package containing the goods with a real name and destination address of the user is utilized by the user to generate a receipt which authorizes the user to pick up the package at the third party destination.

7. The method of claim 3 wherein data from the intermediary machine correlating a unique identifier on a label of a package containing the goods with a real name and destination address of the user is utilized to re-label the package while the package is in the custody of an entity associated with the third party destination, and wherein data from the intermediary machine is also utilized by the user to generate a receipt which authorizes the user to pick up the package at the third party destination.

* * * * *